United States Patent

Lee et al.

[11] Patent Number: 5,949,533
[45] Date of Patent: Sep. 7, 1999

[54] OPTICAL FIBER DISTORTION MEASUREMENT DEVICE AND METHOD THEREOF

[75] Inventors: Zhixien Lee; Haruyoshi Uchiyama, both of Tokyo, Japan

[73] Assignee: Ando Electric Co., Ltd., Tokyo, Japan

[21] Appl. No.: 09/102,316

[22] Filed: Jun. 22, 1998

[30] Foreign Application Priority Data

Jun. 27, 1997 [JP] Japan .................................. 9-172504

[51] Int. Cl.⁶ .................................................. G01N 21/88
[52] U.S. Cl. .......................................... 356/73.1; 356/350
[58] Field of Search ..................................... 356/73.1, 350

[56] References Cited

U.S. PATENT DOCUMENTS 5,627,927  5/1997  Udd .
5,767,956  6/1998  Yoshida .................................. 356/73.1

FOREIGN PATENT DOCUMENTS 196 38 390
   A1    3/1997  Germany .
5-346370 12/1993  Japan .

OTHER PUBLICATIONS

Garus et al., "Brillouin Optical–Fiber Frequency–Domain Analysis for Distributed Temperature and Strain Measurements", J. of Lightwave Tech., vol. 15, No. 4, pp. 654–662 (Apr. 1997).
Kurashima et al., "Brillouin Optical–Fiber Time Domain Reflectometry", IEICE Transactions on Communications, vol. E76–B, No. 4, pp. 382–389 (Apr. 1993).

*Primary Examiner*—Robert H. Kim
*Assistant Examiner*—Tu T. Nguyen
*Attorney, Agent, or Firm*—Fish & Richardson P.C.

[57] ABSTRACT

An optical fiber distortion measurement system (i.e., device and method) measures an optical fiber, which is constructed by alternately connecting two kinds of optical fibers whose Brillouin frequency shifts are different from each other. The system sequentially supplies optical pulses to the measured optical fiber while changing their light frequencies, so that Brillouin backscattering beams are output from the measured optical fiber. At first, the system supplies an optical pulse having a prescribed light frequency to the measured optical fiber of a non-distortion state, so that the device produces initial data representing time-related variations of light intensity of Brillouin backscattering light output from the measured optical fiber. Then, the system measures a time-related variation waveform representing light intensity of Brillouin backscattering light, which is output from the measured optical fiber supplied with the optical pulse of the prescribed light frequency. By comparing the measured time-related variation waveform with the initial data, the system determines occurrence of distortion in the measured optical fiber. Thereafter, the system discriminates a kind of the distortion, which corresponds to expansion or contraction, on the basis of a relationship between Brillouin frequency shifts, which are respectively calculated with respect to a detection point and its adjacent point on the measured time-related variation waveform. The Brillouin frequency shift is calculated in accordance with a quadratic approximation formula, which is created on the basis of the initial data.

10 Claims, 9 Drawing Sheets

OPTICAL FIBER DISTORTION MEASUREMENT DEVICE AND METHOD THEREOF

BACKGROUND OF THE INVENTION

1. Field of the Invention

This invention relates to optical fiber distortion measurement devices and methods thereof, which measure optical fiber distortions in response to Brillouin backscattering light that occur when optical pulses are incident on measured optical fibers. This application is based on patent application No. Hei 9-172504 filed in Japan, the content of which is incorporated herein by reference.

2. Description of the Related Art

Recently, there are provided optical fiber distortion measurement devices that measure optical fiber distortions in response to Brillouin backscattering light. Herein, optical pulses are incident on optical fibers, in which Brillouin backscattering light occurs, which is detected and analyzed to measure the optical fiber distortions. This technique is established using the known property of the Brillouin backscattering light. That is, when a distortion occurs at a certain position of the optical fiber, frequency distribution (i.e., spectrum) of the Brillouin backscattering light that occurs at an arbitrarily selected position is shifted by a value corresponding to a distortion value as compared with the case where the optical fiber has no distortion.

Figure 9:
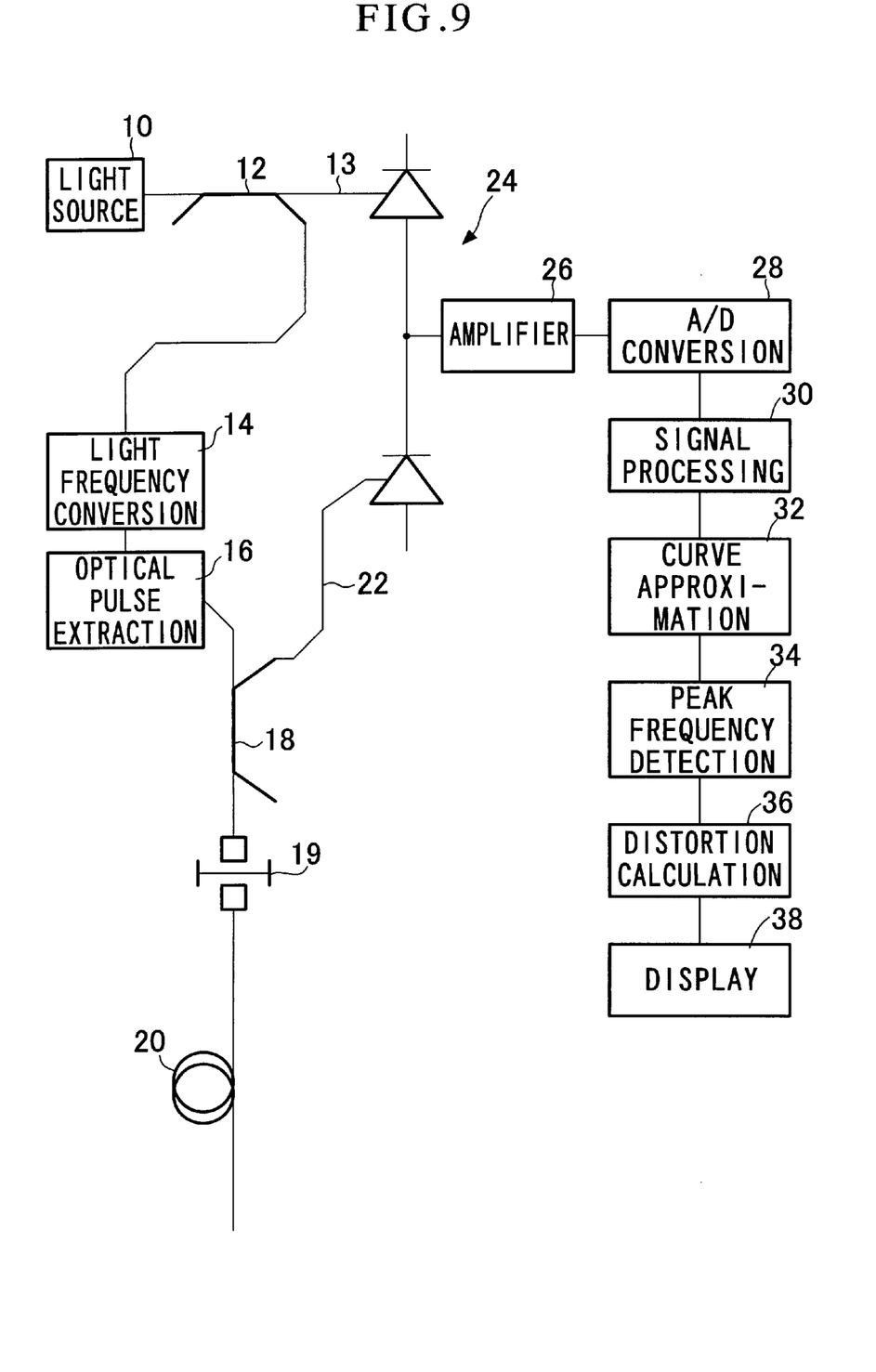
FIG. 9 is a block diagram showing an example of a configuration of the optical fiber distortion measurement device.

FIG. 9 is a block diagram showing an example of a configuration of the optical fiber distortion measurement device. In FIG. 9, reference symbol "10" designates a light source that generates laser beams of continuous light, while "12" designates an optical coupler. The optical coupler 12 has two incoming terminals and two outgoing terminals. Herein, laser beams generated by the light source 10 are incident on a first incoming terminal of the optical coupler 12. The optical coupler 12 branches off the incoming laser beams to the outgoing terminals.

A first outgoing terminal of the optical coupler 12 is connected to an optical fiber 13. A second outgoing terminal of the optical coupler 12 is connected to a light frequency conversion circuit 14 by means of an optical fiber. The light frequency conversion circuit 14 converts light frequency of the incoming continuous light to produce a string of optical pulses, which have a prescribed light frequency difference. An outgoing terminal of the light frequency conversion circuit 14 is connected to an incoming terminal of an optical pulse extraction circuit 16 by an optical fiber. So, the optical pulse extraction circuit 16 extracts optical pulses having a prescribed light frequency v from the incoming optical pulse string thereof so as to output them.

An outgoing terminal of the optical pulse extraction circuit 16 is connected to an incoming terminal of an optical coupler 18. The optical coupler 18 has one incoming terminal and two incoming/outgoing terminals. Herein, a first incoming/outgoing terminal is connected to an optical fiber, which is optically connected to a measured optical fiber 20 by means of an optical connector 19. A second incoming/outgoing terminal of the optical coupler 18 is connected to an optical fiber 22.

The aforementioned optical fibers 13 and 22 are connected to a light receiving circuit 24. The light receiving circuit 24 has two photodiodes. Beams from the optical fiber 13 are incident on a first photodiode, while beams from the optical fiber 22 are incident on a second photodiode. The light receiving circuit 24 performs heterodyne wave detection on the incoming beams thereof and converts them to electric signals.

An amplifier circuit 26 amplifies the electric signals output from the light receiving circuit 24. An analog-to-digital conversion circuit (hereinafter, simply referred to as an A/D conversion circuit) performs sampling and quantization on the electric signals output from the amplifier circuit 26 so as to convert them to digital signals.

A signal processing circuit 30 performs signal processing such as noise elimination and logarithmic conversion on the digital signals output from the A/D conversion circuit 28. A curve approximation block 32 approximates light frequency characteristics of the measured optical fiber 20 in a form of a quadratic curve.

A peak frequency detection block 34 is provided to obtain a light frequency at a certain point of the approximated quadratic curve that has a peak value. A distortion value calculation block 36 calculates distortion values from measurement results. A display unit 38 is configured by the CRT (i.e., Cathode Ray Tube), or a liquid crystal display.

Next, a description will be given with respect to operation of the optical fiber distortion measurement device of FIG. 9.

[Measurement of time-related variation waveform]

In FIG. 9, the continuous light output from the light source 10 branches off by the optical coupler 12, so that branch beams are produced. One of the branch beams is incident on the light receiving circuit 24, while another one is incident on the light frequency conversion circuit 14.

The light frequency conversion circuit 14 produces a string of optical pulses, which have a certain light frequency difference against the continuous light generated by the light source 1. So, an optical pulse string from the light frequency conversion circuit 14 is incident on the optical pulse extraction circuit 16, which extracts optical pulses having a prescribed light frequency υ. Thus, the optical pulse extraction circuit 16 outputs the optical pulses having the prescribed light frequency υ, which are then incident on the measured optical fiber 20 by means of the optical coupler 18.

When the aforementioned optical pulses are incident on the measured optical fiber 20, Brillouin backscattering beams (or Brillouin backscattering light) occur at certain positions of the measured optical fiber 20 respectively. So, the Brillouin backscattering beams are sequentially incident on the light receiving circuit 24 by means of the optical coupler 18 while being delayed by times that are proportional to distances measured from the incoming terminal of the measured optical fiber 20 to the respective positions of the measured optical fiber 20.

Using the continuous light generated by the light source 1, the light receiving circuit 24 performs heterodyne wave detection sequentially on the Brillouin backscattering beams, which occur at the positions of the measured optical fiber 20 respectively. Thus, the light receiving circuit 24 produces electric signals, which are proportional to light intensities of the Brillouin backscattering beams that occur at the positions of the measured optical fiber 20 respectively. The amplifier circuit 28 amplifies the electric signals output from the light receiving circuit 24. Then, the A/D conversion circuit 28 performs analog-to-digital conversion on the electric signals amplified by the amplifier circuit 26 so as to convert them to digital signals.

The signal processing block 30 performs signal processing such as noise elimination and logarithmic conversion on electric signal values corresponding to the converted digital signals. Then, the signal processing block 30 performs plotting on the electric signal values in response to an elapsed time, which is measured from the incidence of the optical pulses, in other words, which corresponds to a distance measured from the incoming terminal of the measured optical fiber 20.

By the aforementioned processes, it is possible to obtain a time-related variation waveform of the Brillouin backscattering light, which occurs when the optical pulses having the light frequency v are incident on the measured optical fiber 20.

Figure 10A:
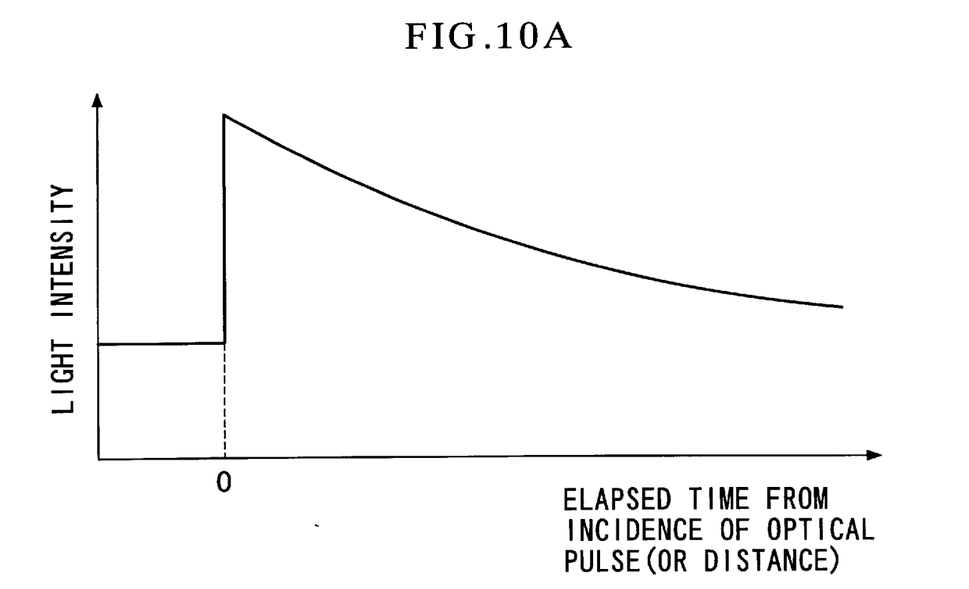
FIG. 10A and FIG. 10B are graphs showing examples of the time-related variation waveform, which are displayed.
Figure 10B:
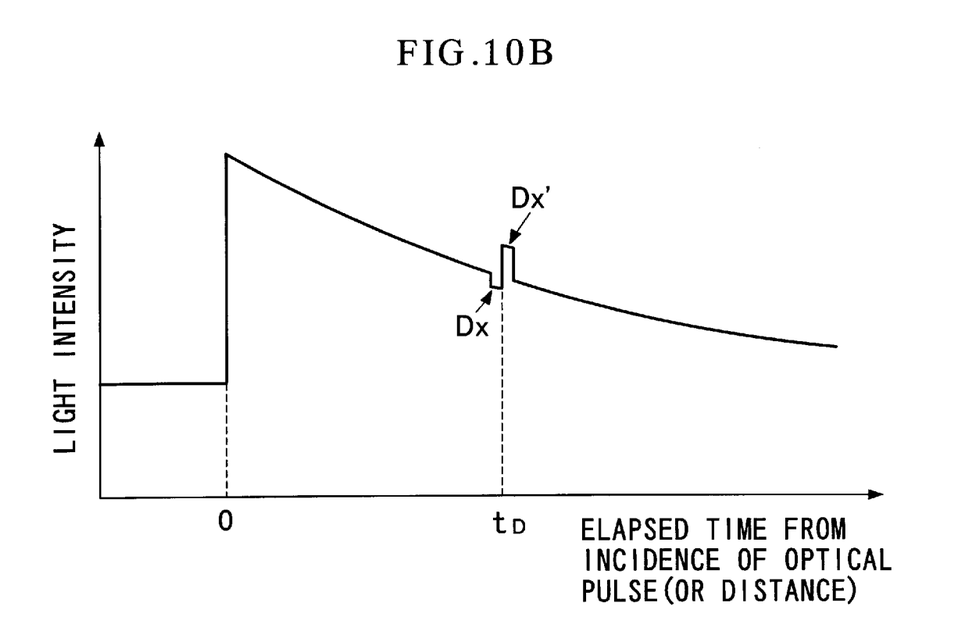

FIG. 10A and FIG. 10B show examples of the time-related variation waveform, which are visually displayed on a screen of the display unit 38. Herein, a horizontal axis represents a lapse of time that elapses from the incidence of the optical pulse. Elapsed times plotted on the time axis correspond to distances, which are measured from the incoming terminal of the measured optical fiber 20 to the positions of the measured optical fiber 20 respectively. A vertical axis represents light intensity of the Brillouin backscattering light, which occurs at each position of the measured optical fiber 20.

As shown in FIG. 10A, when the optical pulse is incident on the measured optical fiber 20, the light intensity of the Brillouin backscattering light that occurs in the measured optical fiber 20 becomes weak in response to the elapsed time, which is measured from the incidence of the optical pulse on the measured optical fiber 20. In other words, the light intensity of the Brillouin backscattering light becomes weak in response to the distance, which is measured from the terminal portion of the optical fiber 20.

[Calculations of distortion value]

Next, a description will be given with respect to a calculation method to calculate a distortion value of the measured optical fiber 20.

When calculating the distortion value of the measured optical fiber 20, the optical fiber distortion measurement device of FIG. 9 uses the light frequency conversion circuit 14 to repeat the aforementioned operations while changing the light frequency v of the optical pulses incident on the measured optical fiber 20 sequentially by a prescribed value.

Thus, the aforementioned time-related variation waveform can be obtained with respect to each of multiple light frequencies.

Figure 11:
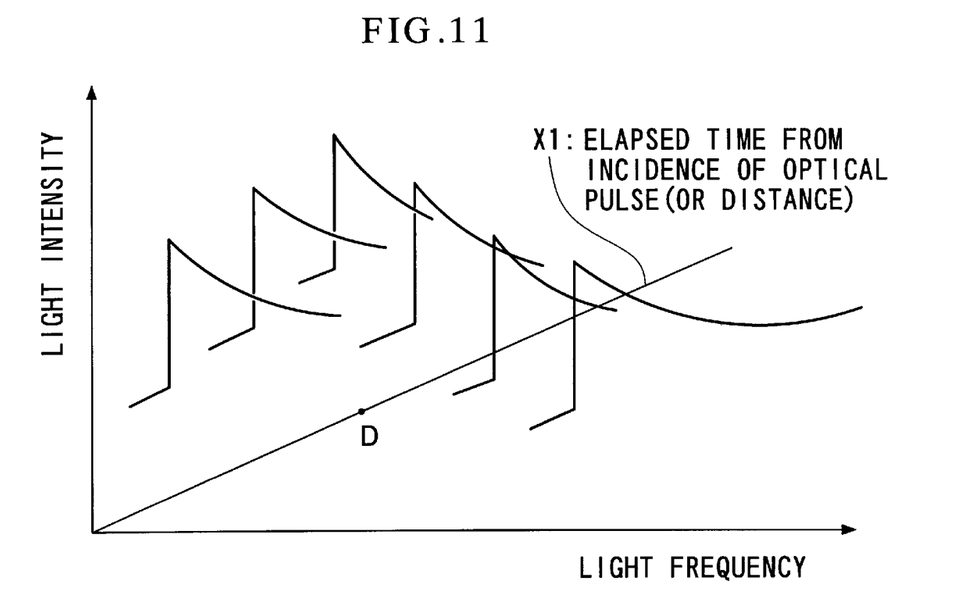
FIG. 11 is a three-dimensional graph showing an example of time-related variation waveforms, which are produced with respect to multiple light frequencies respectively.

FIG. 11 is a three-dimensional graph showing an example of time-related variation waveforms that are formed in response to the multiple light frequencies respectively. Herein, a horizontal axis represents the light frequency υ of the optical pulse incident on the measured optical fiber 20, while a vertical axis represents light intensity of the Brillouin backscattering light. Another axis "X1" that crosses the above horizontal and vertical axes represents a lapse of time measured from the incidence of the optical pulse(s), in other words, a distance measured from the incoming terminal of the measured optical fiber 20 (i.e., a position within the measured optical fiber 20). That is, a coordinates plane formed between the vertical axis and the axis X1 of FIG. 11 corresponds to a coordinates plane shown in FIG. 10A and FIG. 10B.

Figure 12:
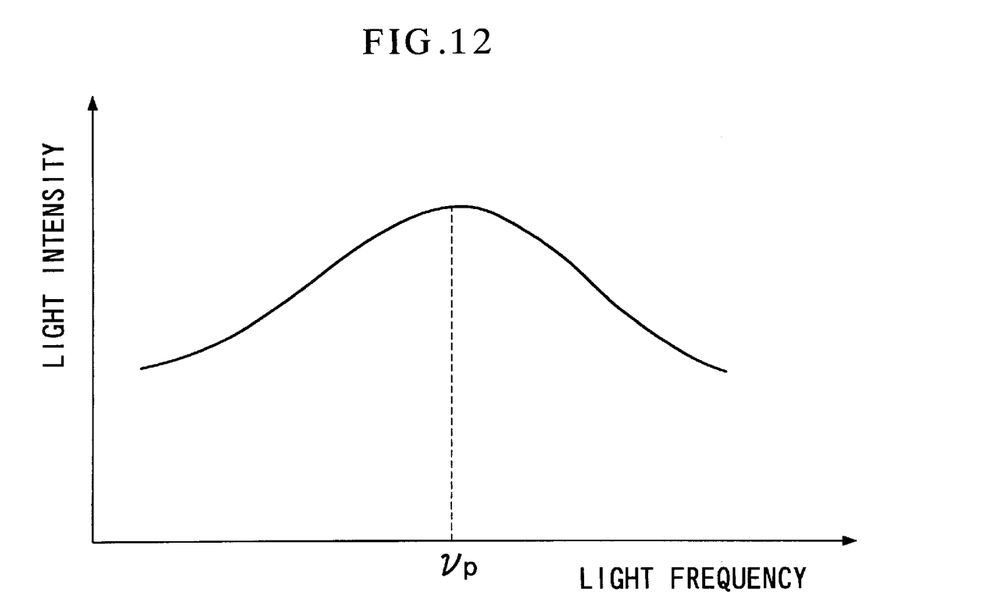
FIG. 12 is a graph showing a spectrum waveform of Brillouin backscattering light at a point D on an axis X1 of the three-dimensional graph of FIG. 11.

In FIG. 11, a point D corresponding to a prescribed distance measured from the incoming terminal of the measured optical fiber is plotted on the axis X1. FIG. 12 is a graph that is formed by cutting the three-dimensional graph of FIG. 11 in a round slice in accordance with a plane perpendicular to the axis X1 at the point D. That is, FIG. 12 shows a waveform (i.e., spectrum waveform) representing frequency distribution (i.e., spectrum) of Brillouin backscattering light with respect to the point D.

Through the aforementioned processes, the spectrum waveform (see FIG. 12) is obtained with respect to the prescribed distance D. The curve approximation block 32 shown in FIG. 9 puts data of the spectrum waveform into a quadratic formula to produce an approximated curve (i.e., quadratically approximated curve) of the spectrum waveform. Then, the peak frequency detection block 34 differentiates the approximated curve to produce a light frequency (denoted by "peak frequency $υ_p$") at which light intensity of the Brillouin backscattering light indicates a maximum value.

Lastly, the distortion calculation block 36 puts the peak frequency $υ_p$, which is detected by the peak frequency detection block 34, into an equation (1) so as to calculate a distortion value ε, as follows:

$$\varepsilon = \frac{v_p - v_b}{v_b \times K} \quad (1)$$

where $υ_b$ represents a peak frequency (which is a fixed value for the measured optical fiber 20) when the measured optical fiber 20 has no distortion, while K represents a distortion coefficient.

Through the above process, it is possible to calculate the distortion value ε with respect to the prescribed distance in the measured optical fiber 20 (i.e., distance D measured from the incoming terminal of the measured optical fiber 20), so that the distortion value is displayed on the screen of the display unit 38.

The foregoing is the description of the operation of the optical fiber distortion measurement device of FIG. 9.

As described above, the aforementioned optical fiber distortion measurement device calculates the distortion value of the measured optical fiber. In that case, every time the measurement is performed, it is necessary to measure time-related variation waveforms of the aforementioned Brillouin backscattering beams with respect to multiple optical frequencies while sequentially changing the light frequency υ. Sometimes, it is necessary to measure the time-related variation waveforms with respect to forty to one hundred kinds of light frequencies.

About two to three seconds is required to measure one time-related variation waveform with respect to one light frequency. In order to measure the distortion value of the measured optical fiber, it is necessary to provide forty-times to one-hundred-times longer time, e.g., maximally six minutes.

As described heretofore, the aforementioned optical fiber distortion measurement device requires much time to measure the distortion value of the measured optical fiber. So, the device suffers from poor efficiency.

Particularly, when the device is used as a fiber sensor, it is important for the measurement time to be short. Thus, there is a problem that the aforementioned optical fiber distortion measurement device cannot be employed as the fiber sensor.

SUMMARY OF THE INVENTION

It is an object of the invention to provide an optical fiber distortion measurement device and an optical fiber distortion measurement method, which are capable of measuring distortion and distortion value of optical fibers in a short period of time and with a good efficiency.

An optical fiber distortion measurement system (i.e., device and method) of this invention is provided to perform measurement on a measured optical fiber, which is constructed by alternately connecting two kinds of optical fibers whose Brillouin frequency shifts are different from each other. Herein, the system sequentially supplies optical pulses to the measured optical fiber while changing their light frequencies, so that Brillouin backscattering beams are output from the measured optical fiber. By analyzing them, the system produces measurement results representing characteristics of the measured optical fiber.

At first, the system supplies an optical pulse having a prescribed light frequency to the measured optical fiber of a non-distortion state, so that the device produces initial data representing time-related variations of light intensity of Brillouin backscattering light output from the measured optical fiber. Herein, the prescribed light frequency is selected in such a way that light intensity of Brillouin backscattering light output from one optical fiber is identical to light intensity of Brillouin backscattering light output from another optical fiber.

Then, the system measures a time-related variation waveform representing light intensity of Brillouin backscattering light, which is output from the measured optical fiber supplied with the optical pulse of the prescribed light frequency. By comparing the measured time-related variation waveform with the initial data, the system determines occurrence of distortion in the measured optical fiber. Thereafter, the system discriminates a kind of the distortion, which corresponds to expansion or contraction, on the basis of a relationship between Brillouin frequency shifts, which are respectively calculated with respect to a detection point and its adjacent point on the measured time-related variation waveform. The detection point is set in response to local reduction in light intensity of the measured optical fiber, for example. Incidentally, the Brillouin frequency shift is calculated in accordance with a quadratic approximation formula, which is created on the basis of the initial data. Further, a distortion value is calculated based on the calculated Brillouin frequency shift. Thus, it is possible to efficiently measure optical fiber distortion in a short period of time.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

Figure 1:
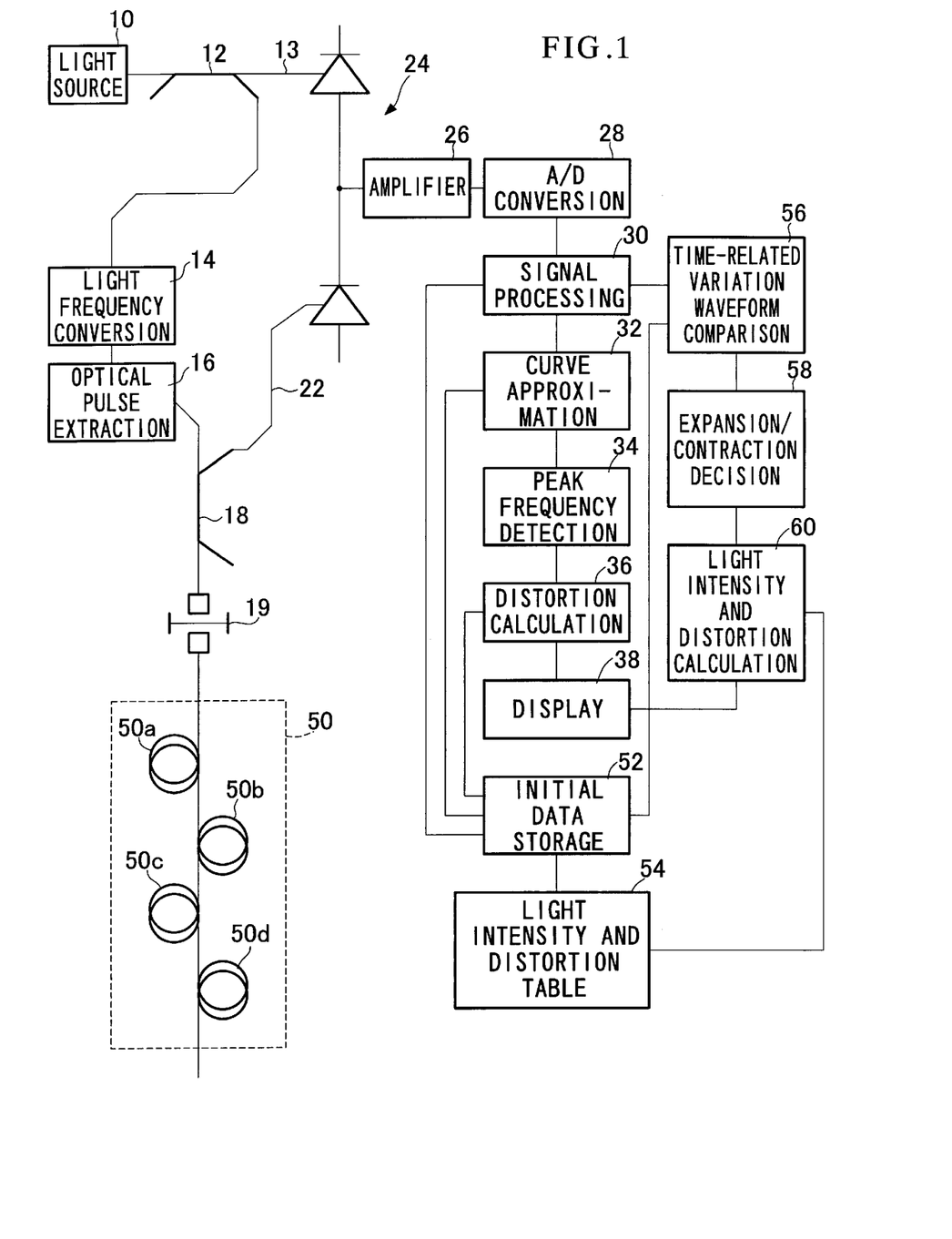
FIG. 1 is a block diagram showing a configuration of a preferred embodiment of an optical fiber distortion measurement device of the present invention.

Referring to FIG. 1, there is shown a preferred embodiment of an optical fiber distortion measurement device of the present invention, which will be described in detail.

FIG. 1 is a block diagram showing an example of a configuration of the optical fiber distortion measurement device according to the preferred embodiment of the invention, wherein parts identical to those of FIG. 9 will be designated by the same reference symbols; hence, the description thereof will be omitted.

As compared with the aforementioned device of FIG. 9, the optical fiber distortion measurement device of FIG. 1 is characterized by being newly equipped with an initial data storage block 52, a light intensity and distortion table 54, a time-related variation waveform comparison block 56, an expansion/contraction decision block 58, and a light intensity and distortion calculation block 60. In addition, there is provided a new measured optical fiber 50, which is different from the aforementioned measured optical fiber 20 shown in FIG. 9. The details of the measured optical fiber 50 will be described later.

The initial data storage block 52 is connected to the signal processing block 30, the curve approximation block 32 and the distortion value calculation block 36. Based on data representing results of measurement which is performed in advance, the initial data storage block 52 stores initial data as follows:

Data representing a relationship (see FIG. 10A and FIG. 10B) between light intensity of the measured optical fiber 50 and elapsed time that elapses from the incoming timing of the optical pulse;

Data representing a relationship (see FIG. 9) between light intensity and optical frequency; and Data corresponding to approximation by the quadratically approximated curve, which represents a relationship between light intensity and optical frequency.

The light intensity and distortion table 54 stores a collative relationship between the light intensity and the measured optical fiber 50. That is, the light intensity and distortion table 54 stores data representing a value of distortion that occurs in response to a value of the light intensity at a certain position of the measured optical fiber 50.

The initial data storage block 52, and the light intensity and distortion table 54 are both configured by large scale storage devices such as the nonvolatile IC memory, hard-disk unit and magneto-optic disk, for example.

The time-related variation waveform comparison block 56 is connected to the signal processing block 30 and the initial data storage block 52. The time-related variation waveform comparison block 56 compares the initial data stored in the initial data storage block 52 with the time-related variation waveform that is obtained by the distortion measurement, the result of which is output from the signal processing block 30. Thus, the time-related variation waveform comparison block 56 compares waveforms to produce their difference. Based on the waveform difference given by the time-related variation waveform comparison block 56, the expansion/contraction decision block 58 makes a decision as to whether the measured optical fiber 50 is now placed in an expanded state or a contracted state.

Through the decision result of the expansion/contraction decision block 58, the light intensity and distortion calculation block 60 calculates a distortion value of the measured optical fiber 50 based on the data stored in the light intensity and distortion table 54.

A group of the time-related variation waveform comparison block 56, the expansion/contraction decision block 58, and the light intensity and distortion calculation block 60 can be actualized by a configuration of a CPU (i.e., Central Processing Unit), a RAM (i.e., Random-Access Memory), a ROM (i.e., Read-Only Memory) and the like (all of which are not shown in figures). In this case, functions of the above blocks are realized by the CPU that executes programs stored in the ROM, for example.

For instance, the measured optical fiber 50 is constructed by alternatively connecting optical fibers each having a different Brillouin frequency shift. In the case of FIG. 1, the measured optical fiber 50 is constructed by sequentially connecting multiple optical fibers 50a, 50b, 50c, 50d, . . . Herein, each of the optical fibers 50a, 50c, . . . has a specific Brillouin frequency shift. In addition, each of the optical fibers 50b, 50d, . . . has a Brillouin frequency, which is different from that of each of the optical fibers 50a, 50c, . . .

A length is set for each of the optical fibers 50a, . . . , 50d, . . . , which form the measured optical fiber 50, as follows:

(Pulse width (ns) of incoming light)×(2 m/10 ns)

Figure 2:
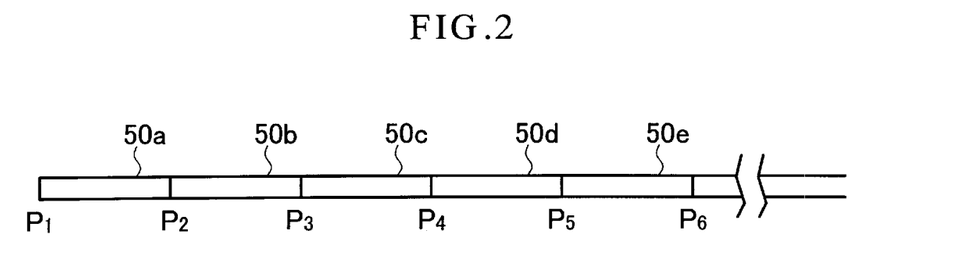
FIG. 2 shows an example of construction of a measured optical fiber used in the optical fiber distortion measurement device of FIG. 1.

In addition, the measured optical fiber 50 is constructed by the normal optical fibers used for communications, wherein a value of the Brillouin frequency shift is identical to "1/(pulse width (ns) of incoming light)". FIG. 2 diagrammatically shows an example of construction of the measured optical fiber 50, which is constructed by optical fibers 50a, 50b, 50c, 50d, 50e, . . . Herein, reference symbol $P_1$ designates a point that an optical pulse is incident on the measured optical fiber 50, while reference symbol $P_2$ designates a point of connection between the optical fibers 50a and 50b. Other reference symbols $P_2$, $P_3$, $P_4$, $P_5$ and $P_6$ designate points of connection among the optical fibers 50b, 50c, 50d, 50e, . . . respectively.

Figure 3:
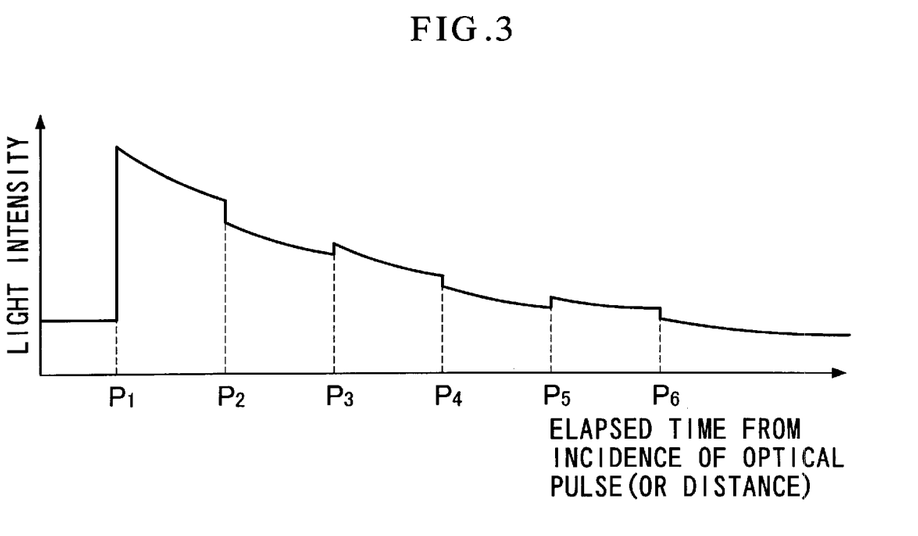
FIG. 3 is a graph showing variations of light intensity, which are obtained when light having a light frequency $\upsilon_{b1}$ is incident on the measured optical fiber of FIG. 2.

When light having a light frequency vbl is incident on the measured optical fiber 50 shown in FIG. 2, it is possible to obtain a measurement result as shown in FIG. 3. FIG. 3 shows a relationship between light intensity and elapsed time, which elapses from the incidence of the optical pulse, when the light of the light frequency $v_{b1}$ is incident on the measured optical fiber 50.

As described before, each of the optical fibers 50b, 50d, . . . is different from each of the optical fibers 50a, 50c, . . . with respect to the Brillouin frequency. For this reason, the light intensity becomes discontinuous at the connection points $P_2$ to $P_6$ among the optical fibers.

Figure 4:
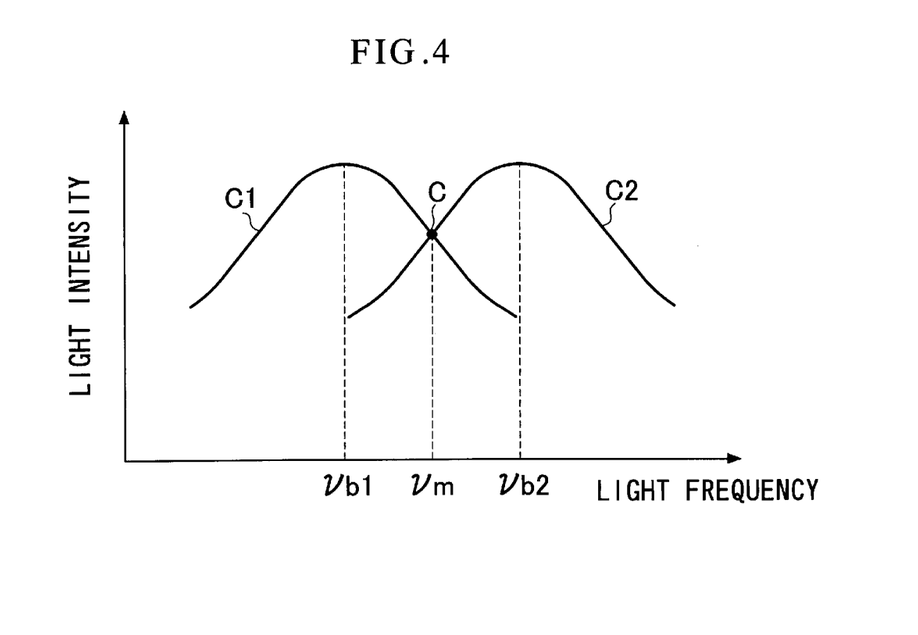
FIG. 4 is a graph showing two kinds of frequency characteristics of Brillouin backscattering light that occurs in the measured optical fiber.

Next, a description will be given with respect to the Brillouin freqeuency of the Brillouin backscattering light that occurs in the measured optical fiber 50. In FIG. 4, a curve C1 represents a frequency characteristic of Brillouin backscattering light that occurs in each of the optical fibers 50a, 50c, . . . , while a curve C2 represents a frequency characteristic of Brillouin backscattering light that occurs in each of the optical fibers 50b, 50d, . . . As shown in FIG. 4, the Brillouin backscattering light has some broad in the light frequency range, while the curve C1 and the curve C2 are different from each other with respect to a center frequency.

Figure 5:
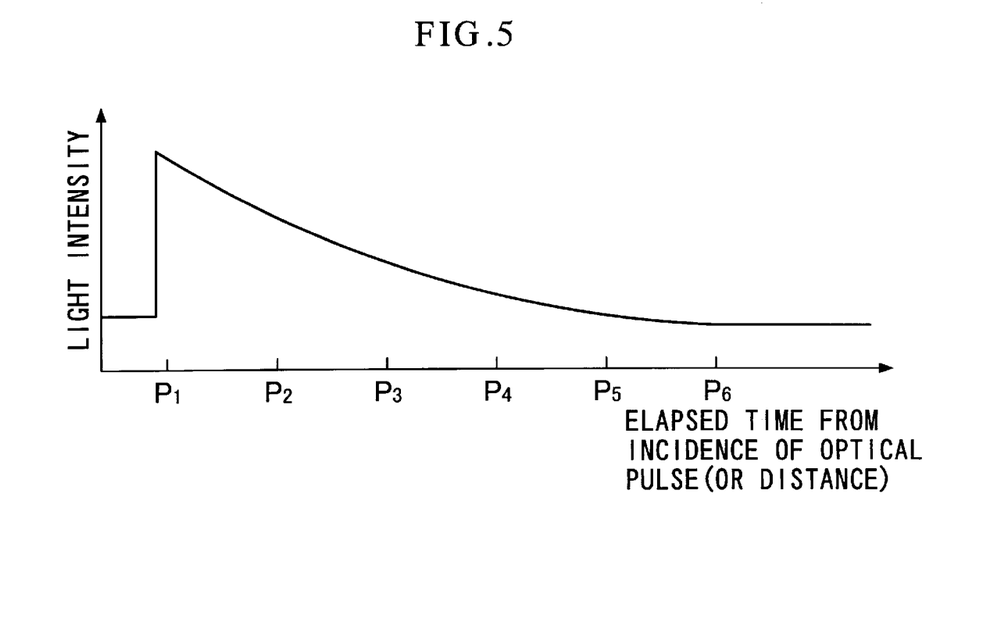
FIG. 5 is a graph showing variations of light intensity, which are obtained when light having a light frequency $\upsilon_m$ is incident on the measured optical fiber.

FIG. 4 shows that the curves C1 and C2 cross with each other at a light frequency $v_m$. That is, if an optical pulse having the light frequency $v_m$ is incident on the measured optical fiber 50, light intensity of the Brillouin backscattering light that occurs in the optical fiber 50a, 50c, . . . becomes identical to light intensity of the Brillouin backscattering light that occurs in the optical fiber 50b, 50d, . . . In that case, there is no discontinuity of the light intensity, which occurs at the connection points $P_2$ to $P_6$ as shown in FIG. 3. FIG. 5 shows an example of a relationship between the light intensity and the elapsed time that elapses from the incidence of the optical pulse when the optical pulse having the light frequency $v_m$ is incident on the measured optical fiber 50.

Next, a description will be given with respect to a relationship between distortion due to expansion and contraction and intensity of Brillouin backscattering light. If distortion due to expansion is imparted to a certain local part of the measured optical fiber 50, intensity of Brillouin backscattering light produced by the optical fiber 50a, 50c, . . . becomes greater than intensity of Brillouin backscattering light produced by the optical fiber 50b, 50d, . . . On the other hand, if distortion due to contraction is imparted to a certain local part of the measured optical fiber 50, intensity of Brillouin backscattering light produced by the optical fiber 50b, 50d, . . . becomes greater than intensity of Brillouin backscattering light produced by the optical fiber 50a, 50c, . . .

Therefore, by making a comparison between the intensity of the Brillouin backscattering light and a value of intensity which is measured in advance, it is possible to make a decision as to whether the distortion of the measured optical fiber occurs due to the expansion or contraction. In addition, by calculating a difference between them, it is possible to detect a degree of distortion.

Next, a description will be given with respect to a preferred embodiment of an optical fiber distortion measurement method of the present invention, which is applicable to the aforementioned optical fiber distortion measurement device.

Figure 6:
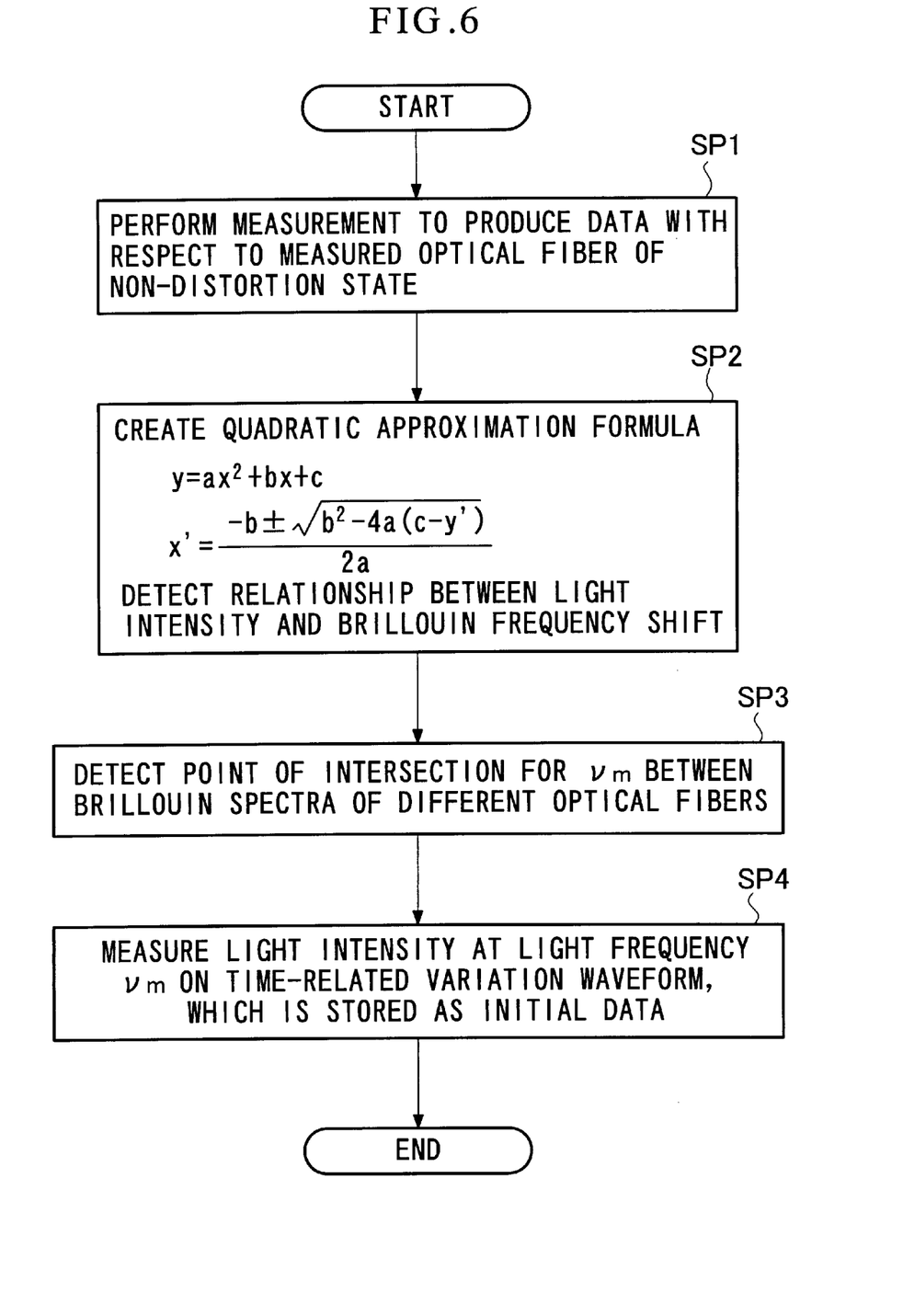
FIG. 6 is a flowchart showing a part of an optical fiber distortion measurement method in accordance with a preferred embodiment of the invention, wherein measurement is performed with respect to non-distortion state of the measured optical fiber.
Figure 7:
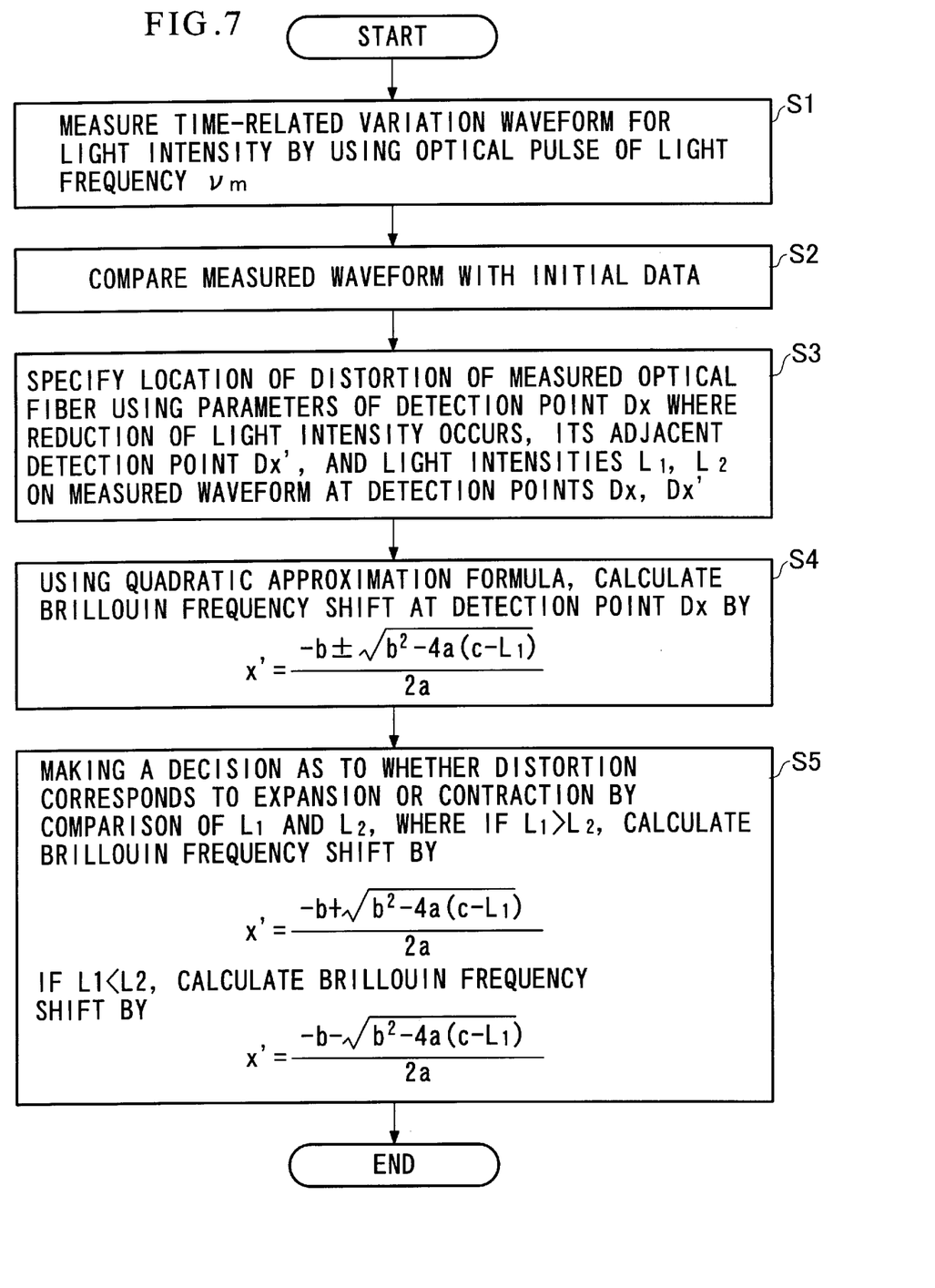
FIG. 7 is a flowchart showing another part of the optical fiber distortion measurement method, wherein measurement is performed with respect to distortion of the measured optical fiber.

FIG. 6 and FIG. 7 are flowcharts showing the preferred embodiment of the optical fiber distortion measurement method of the present invention. The present optical fiber distortion measurement method is mainly configured by two processes. In the first process which is shown in FIG. 6, measurement is performed to produce measurement data under the condition where the measured optical fiber 50 has no distortion. In the second process which is shown in FIG. 7, measurement is performed with respect to distortion of the measured optical fiber 50. If the first process of FIG. 6 that is performed to produce measurement data is performed one time, it is unnecessary to perform the first process again.

Now, a description will be given with respect to the first process of FIG. 6 that is performed to produce measurement data. In step SP1, the optical pulse distortion measurement device performs a process to produce a three-dimensional graph, as shown in FIG. 11, by performing a measurement while sequentially changing frequencies of optical pulses that are incident on the measured optical fiber 50 shown in FIG. 1. That is, the device performs a measurement using a constant frequency of an optical pulse, which is incident on the measured optical fiber 50, so that the device measures a relationship between light intensity and time that elapses from incidence of the optical pulse. Then, the device sequentially changes light frequencies of optical pulses, which are sequentially incident on the measured optical fiber 50. Based on measurement results, the device produces a three-dimensional graph. The measurement results are stored in the initial data storage block 52, shown in FIG. 1, as initial data.

At completion of the measurement, the device proceeds to step SP2. In step SP2, the device analyzes the measurement results to produce a relationship (see FIG. 12) between light intensity and light frequency at a prescribed position of the measured optical fiber, which corresponds to a prescribed distance from the incoming terminal of the measured optical fiber. That is, the device firstly produces a relationship between light intensity (denoted by "y") and frequency shift (denoted by "x") in accordance with a quadratic approximation formula of "$y=ax^2+bx+c$" on the basis of the initial data, which are obtained by the aforementioned step SP1. Then, the device stores data representing such a relationship in the light intensity and distortion table 54.

Values stored in the light intensity and distortion table 54 correspond to coefficients a, b, c of the quadratic approximation formula. Therefore, by performing differentiation on the formula of "$y=ax^2+bx+c$" having the above coefficients a, b, c, it is possible to calculate a light frequency that places Brillouin backscattering light, occuring in the measured optical fiber 50 of non-distortion state, to be in a condition of maximum, in accordance with an equation (2) as follows:

$$x = -\frac{b}{2a} \quad (2)$$

A value of the above light frequency x is stored in the light intensity and distortion table 54 as well. A distortion value ε corresponding to the non-distortion state is set at 0%.

Because the optical fiber 50a, 50c, ... is different from the optical fiber 50b, 50d, ... with respect to Brillouin frequency of Brillouin backscattering light, the device obtains measurement results as shown in FIG. 4. So, the quadratic approximation formula is created with respect to each of curves.

At completion of the step SP2, the device proceeds to step SP3. In step SP3, the device detects a point of intersection between two curves, which are produced by the aforementioned step SP2. That is, the device calculates the light frequency $υ_m$ at the point C where two curves intersect with each other in FIG. 4. This is the process that produces a point of intersection between two quadratic curves, which can be produced easily by calculations. After completion of the above process, the device proceeds to step SP4, wherein measurement data of the time-related variation waveform corresponding to the light frequency $υ_m$ are stored in the initial data storage block 52 as the initial data.

Next, a description will be given with respect to the second process of FIG. 7 that measures the distortion of the measured optical fiber 50.

When measurement is started, the optical fiber distortion measurement device detects a time-related variation waveform of Brillouin backscattering light, which occurs when an optical pulse having the light frequency $υ_m$ is incident on the measured optical fiber (see step S1 in FIG. 7). Now, suppose that the present embodiment detects a time-related variation waveform of FIG. 10A (i.e., initial data) with respect to the measured optical fiber of non-distortion state while detecting a time-related variation waveform of FIG. 10B with respect to the measured optical fiber having distortion, for example. That is, a distorted area of the measured optical fiber corresponds to a position of the measured optical fiber at which an optical pulse reaches after an elapsed time $t_D$, which elapses from the incidence of the optical pulse on the measured optical fiber.

In the following description, positions regarding occurrence of distortion in the measured optical fiber are designated by reference symbols Dx and Dx', which in turn represent distances measured from the incoming terminal of the measured optical fiber. In the case of the time-related variation waveform of FIG. 10B, light intensity varies at the distances Dx and Dx'.

At completion of the measurement of step S1, the device proceeds to step S2, wherein there are provided first time-related variation waveform data which are stored in the initial data storage block 52 and which represent the time-related variation waveform of FIG. 10A as well as second time-related variation waveform data which are measured in the forgoing step S1 and which represent the time-related variation waveform of FIG. 10B. So, the time-related variation waveform comparison block 56 compares the first time-related variation waveform data with the second time-related variation waveform data so as to produce a waveform difference therebetween.

At completion of the step S2, the device proceeds to step S3, wherein a decision is made as to whether the measured optical fiber 50 is subjected to expansion or contraction. The above decision is made based on comparison result of the time-related variation waveform comparison block 56 in step S2. If the device makes a decision that distortion occurs on the measured optical fiber 50, the device sets detection points $D_x$ and $D_x'$ as follows:

The detection point $D_x$ is set at a position where the waveform difference occurs so that light intensity decreases. The detection point $D_x'$ is set adjacent to the detection point $D_x$, wherein the detection point $D_x'$ is set at a position where light intensity increases.

Reference symbol $L_1$ is used to designate light intensity of Brillouin backscattering light at the detection point $D_x$, while reference symbol $L_2$ is used to designate light intensity of Brillouin backscattering light at the detection point $D_x'$.

Through the above process, it is possible to specifiy a location where the distortion occurs in the measured optical fiber 50.

At completion of the above process, the device proceeds to step S4, which performs a process to calculate a Brillouin frequency shift at the detection point $D_x$ in accordance with the quadratic approximation formula that is produced by the aforementioned process shown in FIG. 6. In step SP2, the device produces the coefficients a, b and c. The process of step S4 is performed by the light intensity and distortion calculation block 60 shown in FIG. 1. The light intensity and distortion calculation block 60 accesses the light intensity and distortion table 54 to read a light frequency x which brings the coefficients a, b, c and the light intensity corresponding to the non-distortion state to be maximum.

The aforementioned light intensities $L_1$ and $L_2$ at the detection points $D_x$ and $D_x'$ are obtained by measurement. A Brillouin frequency shift value x' is calculated in accordance with an equation (3) as follows:

$$x' = \frac{-b \pm \sqrt{b^2 - 4a(c - L_1)}}{2a} \quad (3)$$

Now, a description will be given with respect to the Brillouin frequency shift in conjunctin with FIG. 8A, FIG. 8B and FIG. 8C.

Figure 8A:
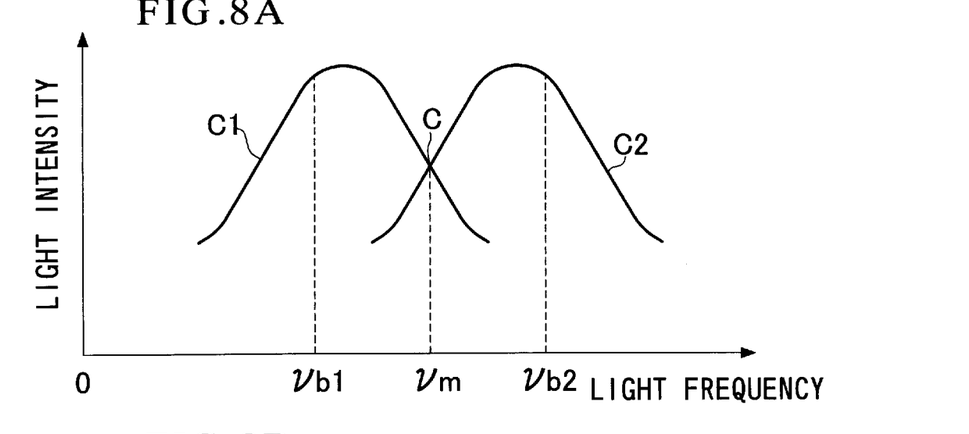
FIG. 8A is a graph showing frequency distribution of Brillouin backscattering light that occurs in the measured optical fiber of non-distortion state.

Under the non-distortion state of the measured optical fiber 50, it is possible to establish a relationship between light intensity and light frequency as shown in FIG. 8A. Data representing such a relationship are stored in the initial data storage block 52 as the initial data by the aforementioned process of FIG. 6.

Now, reference symbol $v_m$ designates the light frequency of the optical pulse that is used to measure distortion of the measured optical fiber 50. Suppose the non-distortion state of the measured optical fiber 50, wherein it is possible to obtain the time-related variation waveform of FIG. 5 in which discontinuity does not occurs at the connection points $P_2$ to $P_6$. In addition, roughly the same frequency distribution of the Brillouin backscattering light emerges with respect to the optical fiber 50a, 50c, . . . as well as the optical fiber 50b, 50d, . . .

If distortion occurs on the measured optical fiber 50, a shift of light frequency occurs on the Brillouin backscattering light of the optical fiber 50a, 50c, . . . as well as the Brillouin backscattering light of the optical fiber 50b, 50d, . . . A manner of such a shift of the light frequency of the Brillouin backscattering light is shown in FIG. 8B and FIG. 8C. Curves C1, C2 shown in FIG. 8B and FIG. 8C correspond to curves C1, C2 shown in FIG. 8A.

Figure 8B:
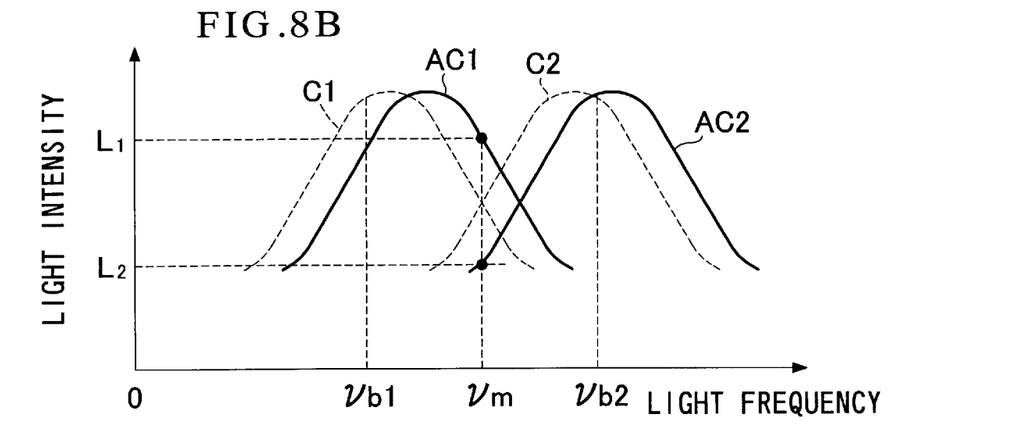
FIG. 8B is a graph showing frequency distribution of Brillouin backscattering light that occurs in the measured optical fiber having distortion corresponding to expansion.
Figure 8C:
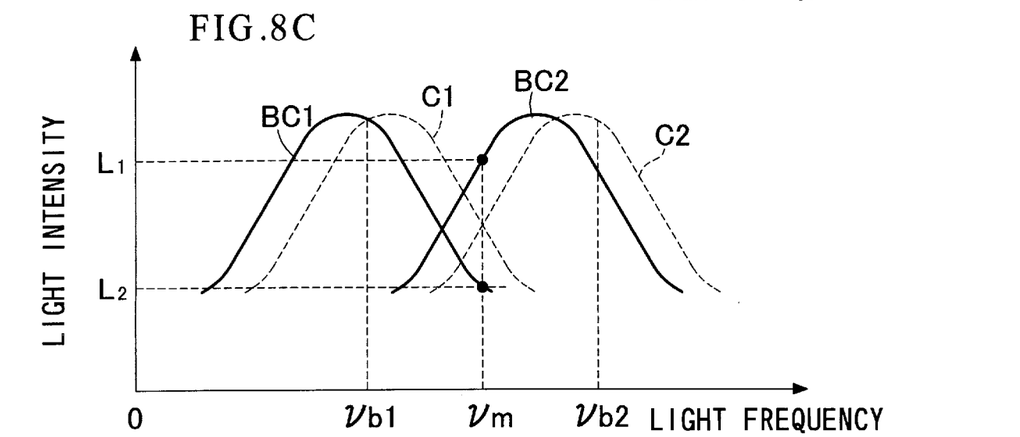
FIG. 8C is a graph showing frequency distribution of Brillouin backscattering light that occurs in the measured optical fiber having distortion corresponding to contraction.

A curve AC1 shown in FIG. 8B and a curve BC1 shown in FIG. 8C represent Brillouin backscattering light, which occurs when frequencies of incoming optical pulses are changed under the condition where distortion occurs on the optical fiber 50a, 50c, . . . On the other hand, a curve AC2 shown in FIG. 8B and a curve BC2 shown in FIG. 8C represent Brillouin backscattering light, which occurs when frequencies of incoming optical pulses are changed under the condition where distortion occurs on the optical fiber 50b, 50d, . . .

Under the condition where distortion occurs on the measured optical fiber 50 as shown in FIG. 8B and FIG. 8C, even if optical pulses of the light frequency $v_m$ are incident on the measured optical fiber 50, a change of light intensity occurs with respect to the Brillouin backscattering light outgoing from the optical fiber 50a, 50b, . . . as well as the Brillouin backscattering light outgoing from the optical fiber 50b, 50d, The present embodiment is designed to measure the distortion by using such a change of the light intensity.

At completion of the above process, the device proceeds to step S5, wherein a decision is made as to whether the distortion corresponds to expansion or contraction of the measured optical fiber 50. In such a decision process, the decision as to whether the distortion corresponds to the expansion or contraction can be realized by comparison between the light intensity $L_1$ of the Brillouin backscattering light at the detection point $D_x$ and the light intensity $L_2$ of the Brillouin backscattering light at the detection point $D_x'$.

FIG. 8B shows frequency distribution of Brillouin backscattering light that occurs in the measured optical fiber having distortion corresponding to expansion. In this case, an inequality of $L_1 > L_2$ is established. In other words, the distortion corresponds to expansion if the light intensity $L_1$ of the Brillouin backscattering light at the detection point $D_x$ is greater than the light intensity $L_2$ of the Brillouin backscattering light at the detection point $D_x'$.

FIG. 8C shows frequency distribution of Brillouin backscattering light that occurs in the measured optical fiber having distortion corresponding to contraction. In this case, an inequality of $L_1 < L_2$ is established. In other words, the distortion corresponds to contraction if the light intensity $L_1$ of the Brillouin backscattering light at the detection point $D_x$ is smaller than the light intensity $L_2$ of the Brillouin backscattering light at the detection point $D_x'$.

Next, the device performs a process to calculate a degree of distortion that occurs in the measured optical fiber. In the case of the distortion corresponding to expansion, the device uses a Brillouin frequency shift value, which is represented by an equation (4) as follows:

$$x' = \frac{-b + \sqrt{b^2 - 4a(c - L_1)}}{2a} \quad (4)$$

In the case of the distortion corresponding to contraction, the device uses a Brillouin frequency shift value, which is represented by an equation (5) as follows:

$$x' = \frac{-b - \sqrt{b^2 - 4a(c - L_1)}}{2a} \quad (5)$$

After completion of the above process, the light intensity and distortion calculation block 60 puts the Brillouin frequency shift (x'), which is calculated by the step S4, into the aforementioned equation (1) as the peak frequency $v_p$, so as to calculate a distortion value $\epsilon$.

Through the aforementioned processes, it is possible to calculate the distortion value $\epsilon$, which is then visually displayed on the screen of the display unit 38.

Suppose an example that in the non-distortion state, outgoing Brillouin backscattering light has light frequency of 10.9 GHz and light intensity of 40 dB, whereas due to occurrence of distortion, the light frequency is changed to 10.6 GHz while the light intensity is changed to 37 dB. In such an example, the device calculates a distortion value $\epsilon$ at 0.6085%.

The aforementioned example of the optical fiber distortion measurement device (and method) takes approximately six minutes for measurement of the distortion value. In contrast, the present embodiment is capable of measuring the distortion value within about two to three seconds.

In addition, the present embodiment is capable of evaluating dynamic distortion value, which cannot be evaluated by the aforementioned example. In the evaluation of the dynamic distortion value, distortion is intentionally caused to occur on the optical fiber, so the device measures and evaluates characteristics of the optical fiber, which vary in response to variations of the distortion. Therefore, it is possible to broaden a range for utilization of the distortion sensor by application of the present invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An optical fiber distortion measurement device that performs measurement on a measured optical fiber, which is constructed by alternately connecting two kinds of optical fibers each having a different Brillouin frequency shift, said measured optical fiber distortion measurement device comprising:

initial data storage means for storing characteristics of the measured optical fiber of a non-distortion state as initial data, wherein the initial data contain an initial time-related variation waveform representing time-related variations of light intensity of Brillouin backscattering light that is output from the measured optical fiber of the non-distortion state after incidence of an optical pulse on the measured optical fiber;

supply means for supplying an optical pulse of a prescribed light frequency to the measured optical fiber;

light receiving means for receiving Brillouin backscattering light, which is output from the measured optical fiber in response to the optical pulse supplied to the measured optical fiber, so as to produce signals;

signal processing means for processing the signals output from the light receiving means so as to produce characteristic data of the measured optical fiber, wherein the signal processing means calculates a time-related variation waveform representing time-related variations of light intensity of Brillouin backscattering light that is output from the measured optical fiber after incidence of the optical pulse on the measured optical fiber;

distortion decision means for making a decision as to whether distortion occurs in the measured optical fiber by comparing the characteristic data of the measured optical fiber with the initial data;

distortion locating means for locating a position of the distortion in the measured optical fiber by comparing the initial time-related variation waveform with the calculated time-related variation waveform; and expansion/contraction decision means for making a decision as to whether the distortion corresponds to expansion of the measured optical fiber or contraction of the measured optical fiber on the basis of the position of the distortion that occurs in the measured optical fiber.

2. An optical fiber distortion measurement device that performs measurement on a measured optical fiber, which is constructed by alternately connecting two kinds of optical fibers each having a different Brillouin frequency shift, said measured optical fiber distortion measurement device comprising:

initial data storage means for storing characteristics of the measured optical fiber in a non-distortion state as initial data;

supply means for supplying an optical pulse of a prescribed light frequency to the measured optical fiber;

light receiving means for receiving Brillouin backscattering light, which is output from the measured optical fiber in response to the optical pulse supplied to the measured optical fiber, so as to produce signals;

signal processing means for processing the signals output from the light receiving means so as to produce characteristic data of the measured optical fiber;

quadratic approximation means for approximating a measurement result, which is obtained in advance while optical pulses sequentially supplied to the measured optical fiber are changed in light frequencies thereof, by a quadratic approximation curve;

storing means for storing coefficients of the quadratic approximation curve as well as a light frequency at which a value of the quadratic approximation curve becomes maximum; and distortion decision means for making a decision as to whether distortion occurs in the measured optical fiber or not by comparing the characteristic data of the measured optical fiber with the initial data.

3. An optical fiber distortion measurement device that performs measurement on a measured optical fiber, which is constructed by alternately connecting two kinds of optical fibers each having a different Brillouin frequency shift, said measured optical fiber distortion measurement device comprising:

initial data storage means for storing characteristics of the measured optical fiber in a non-distortion state as initial data;

supply means for supplying an optical pulse of a prescribed light frequency to the measured optical fiber;

light receiving means for receiving Brillouin backscattering light, which is output from the measured optical fiber in response to the optical pulse supplied to the measured optical fiber, so as to produce signals;

signal processing means for processing the signals output from the light receiving means so as to produce characteristic data of the measured optical fiber;

quadratic approximation means for approximating a measurement result, which is obtained in advance while optical pulses sequentially supplied to the measured optical fiber are changed in light frequencies thereof, according to a quadratic approximation curve;

distortion decision means for making a decision as to whether distortion occurs in the measured optical fiber or not by comparing the characteristic data of the measured optical fiber with the initial data;

calculating means for calculating a difference between light intensity at a first light frequency at which a value of the quadratic approximation curve becomes maximum and light intensity of the characteristic data so as to produce a second light frequency at which light intensity of the Brillouin backscattering light becomes maximum; and distortion value calculating means for calculating a distortion value based on the first light frequency and the second light frequency.

4. An optical fiber distortion measurement method comprising:

providing a measured optical fiber, which is constructed by alternately connecting two kinds of optical fibers each having a different Brillouin frequency shift;

measuring characteristics of the measured optical fiber in a non-distortion state;

producing characteristic data of the measured optical fiber based on time-related variations of light intensity of Brillouin backscattering light that is output from the measured optical fiber when an optical pulse of a prescribed light frequency is incident on the measured optical fiber;

determining whether distortion occurs in the measured optical fiber by comparing the characteristic data of the measured optical fiber with the characteristics of the measured optical fiber in the non-distortion state;

locating the position of distortion that occurs in the measured optical fiber by comparing time-related variations of the characteristic data and time-related variations in characteristics of the measured optical fiber of the non-distortion state; and making a decision as to whether the distortion corresponds to expansion or contraction on the basis of light intensity of the Brillouin backscattering light at the position of the distortion in the measured optical fiber.

5. An optical fiber distortion measurement method comprising:

providing a measured optical fiber, which is constructed by alternately connecting two kinds of optical fibers each having a different Brillouin frequency shift;

measuring characteristics of the measured optical fiber in a non-distortion state;

producing characteristic data of the measured optical fiber based on time-related variations of light intensity of Brillouin backscattering light that is output from the measured optical fiber when an optical pulse of a prescribed light frequency is incident on the measured optical fiber;

approximating a measurement result, which is obtained in advance while optical pulses sequentially supplied to the measured optical fiber are changed in light frequencies thereof, according to a quadratic approximation curve;

determining whether distortion of the measured optical fiber corresponds to expansion or contraction by comparing the characteristics of the measured optical fiber in the non-distortion state with the characteristic data;

storing coefficients of the quadratic approximation curve as well as a first light frequency at which a value of the quadratic approximation curve becomes maximum;

calculating a difference between light intensity at the first light frequency and light intensity of the characteristic data so as to produce a second light frequency at which light intensity of the Brillouin backscattering light becomes maximum; and calculating a distortion value of the measured optical fiber based on the first light frequency and the second light frequency.

6. An optical fiber distortion measurement device that performs measurement on a measured optical fiber, which is constructed by alternately connecting first and second optical fibers whose Brillouin frequency shifts are different from each other, said optical fiber distortion measurement device comprising:

initial data measuring means for measuring initial data representing time-related variations of light intensity of Brillouin backscattering light that is output from the measured optical fiber of a non-distortion state in response to an optical pulse, having a prescribed light frequency, which is incident on the measured optical fiber, wherein the prescribed light frequency is selected in such a way that light intensity of Brillouin backscattering light output from the first optical fiber is identical to light intensity of Brillouin backscattering light output from the second optical fiber;

initial data storage means for storing the initial data;

measurement means for measuring a time-related variation waveform representing time-related variations of light intensity of the Brillouin backscattering light that occurs in the measured optical fiber supplied with the optical pulse having the prescribed light frequency;

distortion detecting means for detecting occurrence of distortion by comparing the measured time-related variation waveform with the initial data;

detection point setting means for setting a detection point on the time-related variation waveform in connection of a position of the distortion in the measured optical fiber; and distortion discriminating means for discriminating a kind of the distortion, which corresponds to expansion or contraction of the measured optical fiber, on the basis of a relationship between Brillouin frequency shifts, which are calculated with respect to the detection point and its adjacent point respectively.

7. An optical fiber distortion measurement device that performs measurement on a measured optical fiber, which is constructed by alternately connecting first and second optical fibers whose Brillouin frequency shifts are different from each other, said optical fiber distortion measurement device comprising:

initial data measuring means for measuring initial data representing time-related variations of light intensity of Brillouin backscattering light that is output from the measured optical fiber of a non-distortion state in response to an optical pulse, having a prescribed light frequency, which is incident on the measured optical fiber;

initial data storage means for storing the initial data;

quadratic approximation means for creating a quadratic approximation formula representing a relationship between light intensity and frequency shift on the basis of the initial data;

measurement means for measuring a time-related variation waveform representing time-related variations of light intensity of the Brillouin backscattering light that occurs in the measured optical fiber supplied with the optical pulse having the prescribed light frequency;

distortion detecting means for detecting occurrence of distortion by comparing the measured time-related variation waveform with the initial data;

detection point setting means for setting a detection point on the time-related variation waveform in connection of a position of the distortion in the measured optical fiber;

calculation means for calculating the Brillouin frequency shift with respect to the detection point and its adjacent point in accordance with the quadratic approximation formula; and distortion discriminating means for discriminating a kind of the distortion, which corresponds to expansion or contraction of the measured optical fiber, on the basis of a relationship between Brillouin frequency shifts, which are calculated with respect to the detection point and its adjacent point respectively.

8. An optical fiber distortion measurement method that performs measurement on a measured optical fiber, which is constructed by alternately connecting first and second optical fibers whose Brillouin frequency shifts are different from each other, said optical fiber distortion measurement method comprising:

measuring initial data representing time-related variations of light intensity of Brillouin backscattering light that is output from the measured optical fiber in a non-distortion state in response to an optical pulse, having a prescribed light frequency, which is incident on the measured optical fiber;

measuring a time-related variation waveform representing time-related variations of light intensity of the Brillouin backscattering light that occurs in the measured optical fiber supplied with the optical pulse having the prescribed light frequency;

detecting occurrence of distortion by comparing the measured time-related variation waveform with the initial data;

setting a detection point on the measured time-related variation waveform in connection with a position of the distortion in the measured optical fiber;

calculating Brillouin frequency shifts with respect to the detection point and its adjacent point respectively; and discriminating a kind of the distortion, which corresponds to expansion or contraction of the measured optical fiber, on the basis of a relationship between the Brillouin frequency shifts.

9. An optical fiber distortion measurement method as defined in claim 8 further comprising:

creating a quadratic approximation formula representing a relationship between light intensity and frequency shift on the basis of the initial data, so that the Brillouin frequency shifts are calculated in accordance with the quadratic approximation formula.

10. An optical fiber distortion measurement method that performs measurement on a measured optical fiber, which is constructed by alternately connecting first and second optical fibers whose Brillouin frequency shifts are different from each other, said optical fiber distortion measurement method comprising:

measuring initial data representing time-related variations of light intensity of Brillouin backscattering light that is output from the measured optical fiber of a non-distortion state in response to an optical pulse, having a prescribed light frequency, which is incident on the measured optical fiber, wherein the prescribed light frequency is selected in such a way that light intensity of Brillouin backscattering light output from the first optical fiber is identical to light intensity of Brillouin backscattering light output from the second optical fiber;

measuring a time-related variation waveform representing time-related variations of light intensity of the Brillouin backscattering light that occurs in the measured optical fiber supplied with the optical pulse having the prescribed light frequency; and detecting occurrence of distortion by comparing the measured time-related variation waveform with the initial data.

* * * * *